(12) United States Patent
Suzuki

(10) Patent No.: US 10,068,478 B2
(45) Date of Patent: Sep. 4, 2018

(54) COMMUNICATION TERMINAL PERIODICALLY PROVIDING POSITION INFORMATION OF THE COMMUNICATION TERMINAL

(71) Applicant: DENSO CORPORATION, Kariya, Aichi-pref. (JP)

(72) Inventor: Tadao Suzuki, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 454 days.

(21) Appl. No.: 14/712,126

(22) Filed: May 14, 2015

(65) Prior Publication Data

US 2015/0334536 A1 Nov. 19, 2015

(30) Foreign Application Priority Data

May 15, 2014 (JP) .................................. 2014-101519

(51) Int. Cl.
| | |
|---|---|
| G08G 1/16 | (2006.01) |
| H04W 4/02 | (2018.01) |
| H04W 4/04 | (2009.01) |
| H04B 1/3822 | (2015.01) |
| H04W 48/14 | (2009.01) |
| H04W 72/04 | (2009.01) |
| G08G 1/005 | (2006.01) |
| H04W 4/80 | (2018.01) |

(52) U.S. Cl.
CPC ............. *G08G 1/163* (2013.01); *G08G 1/005* (2013.01); *H04B 1/3822* (2013.01); *H04W 4/046* (2013.01); *H04W 4/80* (2018.02); *H04W 48/14* (2013.01); *H04W 72/048* (2013.01)

(58) Field of Classification Search
CPC ...... G08G 1/163; G08G 1/005; H04B 1/3822; H04W 4/008; H04W 4/046; H04W 72/048
See application file for complete search history.

(56) References Cited

U.S. PATENT DOCUMENTS

| | | | |
|---|---|---|---|
| 2010/0312432 A1* | 12/2010 | Hamada ................. | G08G 1/163 |
| | | | 701/31.4 |
| 2012/0302264 A1 | 11/2012 | Wakabayashi et al. | |
| 2015/0304817 A1* | 10/2015 | Yorifuji ................... | H04M 1/67 |
| | | | 455/456.1 |

FOREIGN PATENT DOCUMENTS

| | | |
|---|---|---|
| JP | 2006-148632 | 6/2006 |
| JP | 2007233478 A | 9/2007 |
| JP | 2009-134363 | 8/2009 |
| JP | 2010-170432 | 8/2010 |

(Continued)

*Primary Examiner* — Kent Krueger
(74) *Attorney, Agent, or Firm* — Harness, Dickey & Pierce, P.L.C.

(57) ABSTRACT

A communication terminal operating with electric power stored in a battery to execute information communication with an external communication device is provided. The communication terminal repetitively acquires specific information including a present position of the communication terminal and transmits the specific information in a transmission period. The communication terminal includes a detection section for detecting a total number of external communication devices present within an area of a pre-specified distance and a setting section for setting the transmission period in accordance with the total number of external communication devices detected by the detection section.

7 Claims, 6 Drawing Sheets

(56) References Cited

FOREIGN PATENT DOCUMENTS

| JP | 2011-154567 | 8/2011 |
|----|-------------|--------|
| JP | 2011253403 A | 12/2011 |
| JP | 2013-131143 | 7/2013 |

\* cited by examiner

COMMUNICATION TERMINAL PERIODICALLY PROVIDING POSITION INFORMATION OF THE COMMUNICATION TERMINAL

CROSS REFERENCE TO RELATED APPLICATION

The present application is based on Japanese Patent Application No. 2014-101519 filed on May 15, 2014, disclosure of which is incorporated herein by reference

TECHNICAL FIELD

The present disclosure relates to a communication terminal that executes wireless communication with another device.

BACKGROUND

Communication terminals carried and used by persons have been known (refer to Patent Literature 1).

The communication terminal of this type periodically transmits position information indicative of a present position of the communication terminal to an in-vehicle communication device installed in a vehicle by wireless information communication.

Patent Literature 1: JP-2009-134363A

The inventor of the present application has found the followings concerning a communication terminal.

In the communication terminal of this type, because a battery is used as power supply, the consumption of electric power is required to be saved.

In order to satisfy this requirement, in the communication terminal disclosed in Patent Literature 1, if another communication terminal is present within an area where a signal can be received through short range wireless communication, the transmission of the position information from the communication terminal stops.

Incidentally, situations around the communication terminal are various. For example, in a specified area from the communication terminal, another communication terminal is not present or multiple other communication terminals are present. Among those situations, there is a situation in which transmission of the position information is considered to be unnecessary.

However, in the communication terminal disclosed in Patent Literature 1, because a condition for stopping the transmission of the position information is that another communication terminal is present within the specified area from the communication terminal, the position information is transmitted even in a situation where the transmission of the position information is considered to be unnecessary.

That is, the inventor of the present application has found that the conventional art is insufficient in implementation of both of the transmission of necessary position information and the saving of power consumption.

SUMMARY

In view of the foregoing, it is an object of the present disclosure to provide a technology for implementing both of transmission of necessary position information and saving of power consumption in a communication terminal.

According to an example of the present disclosure, a subject communication terminal operates with electric power stored in a battery and executes information communication with an external communication device separated from and external to the subject communication terminal. The subject communication terminal comprises a terminal information acquisition section, a position acquisition section, a transmission section, a detection section, and a setting section. The terminal information acquisition section repetitively acquires terminal information including a present position of the external communication device by the information communication. The position acquisition section repetitively acquires specific information including a present position of the subject communication terminal. The transmission section transmits the specific information by the information communication in a set transmission period, the specific information being acquired by the position acquisition section. The detection section detects a total number of external communication devices present within an area of a pre-specified distance from the subject communication terminal based on the present position included in the specific information acquired by the position acquisition section and the terminal information acquired by the terminal information acquisition section. The setting section sets the transmission period in accordance with the total number of external communication devices detected by the detection section.

According to the above configuration, both of transmission of necessary position information and saving of power consumption can be accomplished in the communication terminal.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Hereinafter, embodiments will be described with reference to the drawings.

Figure 1:
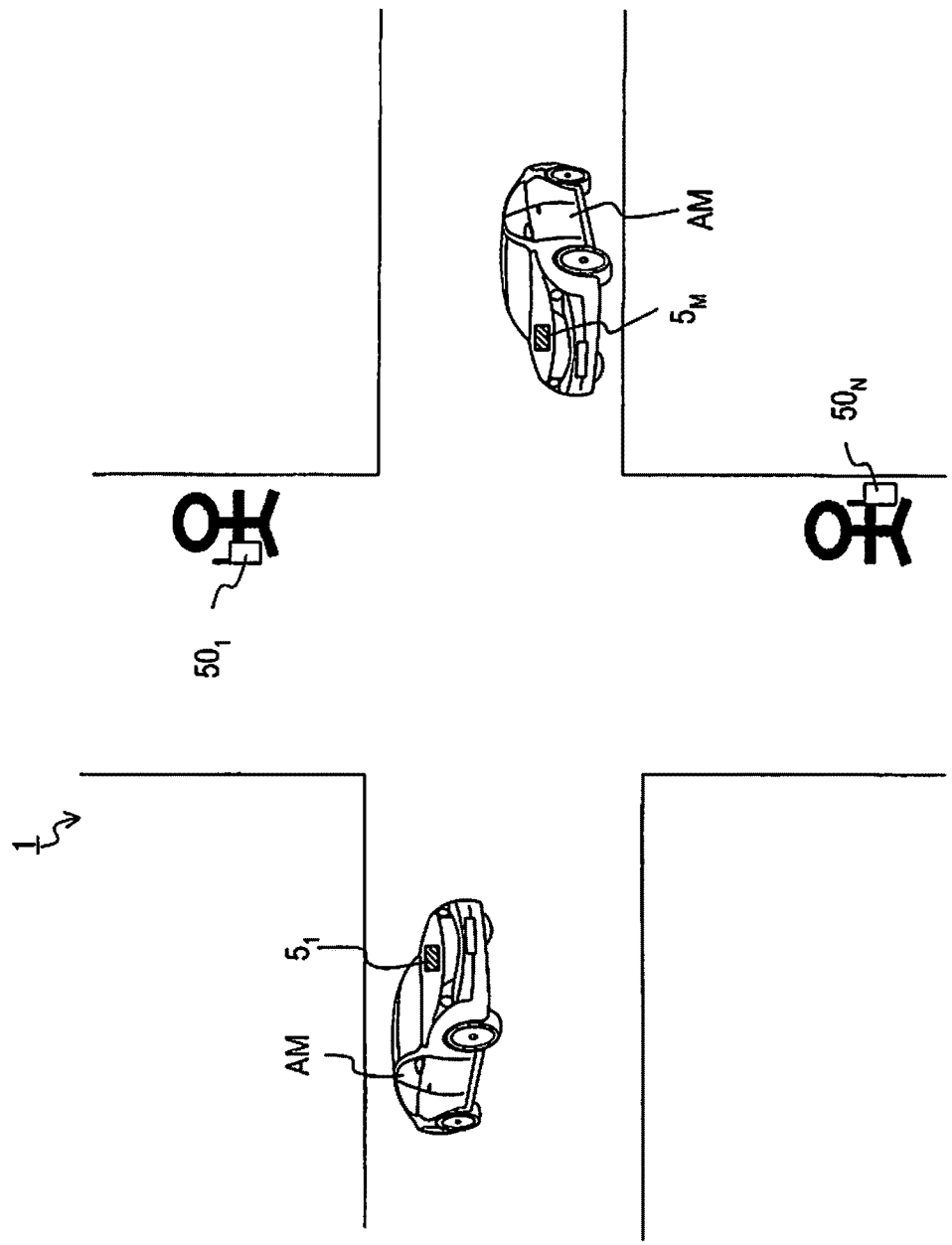
FIG. 1 is a diagram illustrating a general configuration of a communication system.

A communication system 1 illustrated in FIG. 1 includes a vehicle system 5 that is installed in a vehicle AM (e.g., automobile), and a communication terminal 50 that is carried by a person. In the communication system 1, the communication terminal 50 satisfying a specified condition periodically transmits information (hereinafter called "specific information") including a position (latitude, longitude, altitude) of the communication terminal 50. The vehicle system 5 that has received the specific information notifies an occupant of the vehicle AM of the position included in the specific information.

In this embodiment, the communication terminal 50 and the vehicle system 5 execute information communication therebetween through vehicle-to-vehicle communication or pedestrian-vehicle communication.

A symbol "M" indicated in FIG. 1 represents an identifier for identifying the vehicle system 5 installed in the vehicle AM, which is a natural number of 1 or more. A symbol "N" represents an identifier for identifying the communication terminal 50, which is a natural number of 1 or more.

<Vehicle System>

Figure 2:
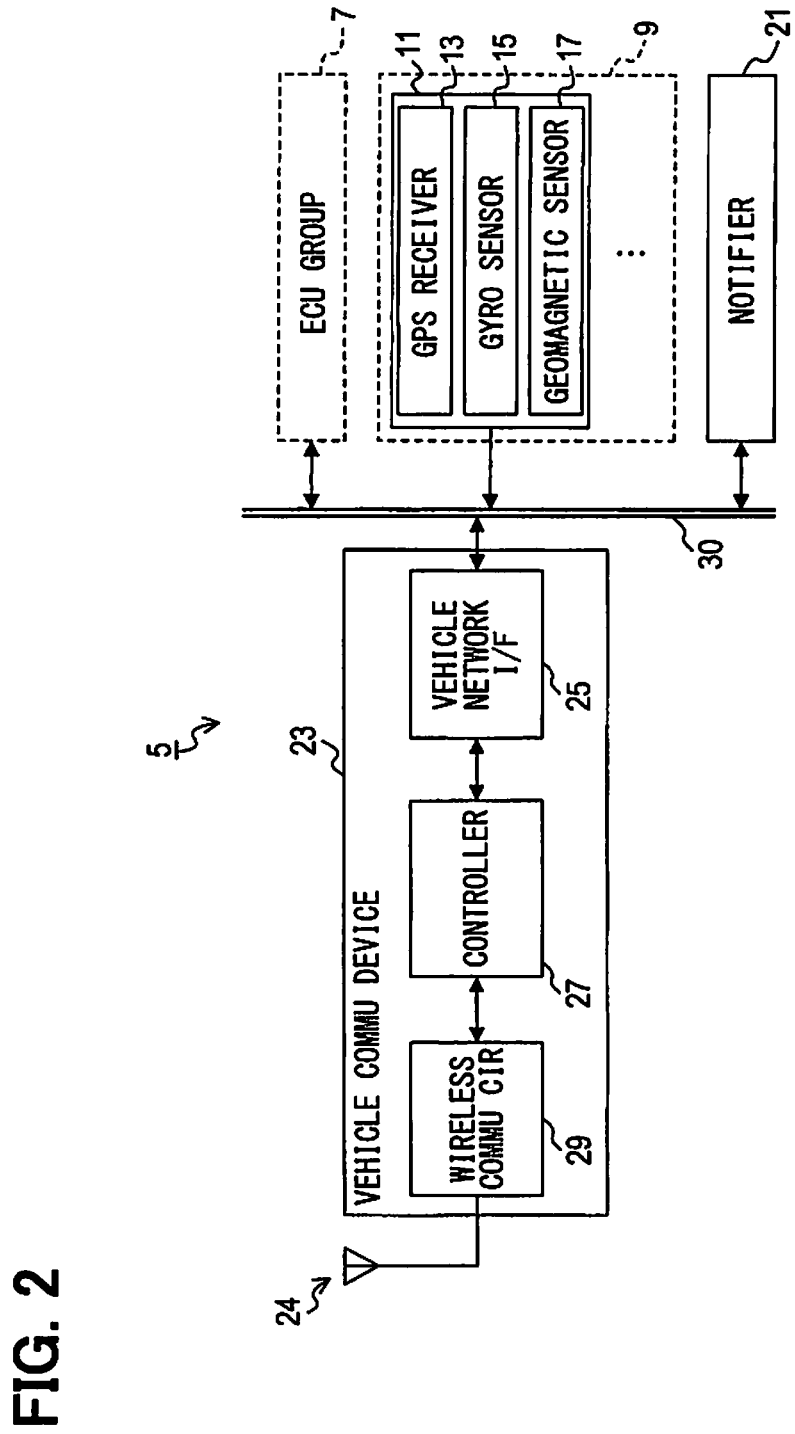
FIG. 2 is a block diagram illustrating a general configuration of a vehicle system.

As illustrated in FIG. 2, the vehicle system 5 includes an electronic control unit group 7, a sensor group 9, a notifier 21, and a vehicle communication device 23. In the vehicle system 5, the electronic control unit group 7, the sensor group 9, the notifier 21, and the vehicle communication device 23 are connected to each other through a vehicle network 30.

Among those components, each electronic control unit (hereinafter called "ECU") included in the electronic control unit group 7 is equipped with a bus controller. The bus controller includes a microcomputer with a ROM, a RAM, and a CPU, for implementing communication through at least the vehicle network 30.

The electronic control unit group 7 includes a telematics ECU an anti-theft ECU, an engine control ECU, a driving support ECU, and an airbag ECU.

The sensor group 9 includes a sensor or a switch for acquiring diverse information on a subject vehicle (i.e., the vehicle equipped with the vehicle system 5 concerned), and includes at least a position detection device 11. The position detection device 11 is configured to detect a present position (latitude, longitude, altitude) of the subject vehicle, and an orientation of a traveling direction, and includes at least a GPS receiver 13, a gyro sensor 15, and a geomagnetic sensor 17. The sensor group 9 additionally includes an acceleration sensor for detecting acceleration applied to the subject vehicle, and a speed sensor for detecting a vehicle speed of the subject vehicle.

The notifier 21 includes a device that outputs various information on the basis of a signal from the vehicle communication device 23 and a signal from the electronic control unit group 7. The notifier 21 may include a display device for displaying an image or a speaker for outputting information by speech.

The vehicle communication device 23 executes information communication with a vehicle communication device installed in another vehicle (i.e., vehicle other than the vehicle equipped with the vehicle communication device 23 of the vehicle system 5 concerned) through the vehicle-to-vehicle communication. Further, the vehicle communication device 23 executes information communication with the communication terminal 50 through the pedestrian-vehicle communication. In the present disclosure, the pedestrian-vehicle communication is of a communication system similar to the vehicle-to-vehicle communication, for example, a system conforming to IEEE802.11p.

The vehicle communication device 23 includes a vehicle network interface (I/F) 25, a controller 27, and a wireless communication circuit 29.

The vehicle network I/F 25 transmits information to and receives information from the electronic control unit group 7, the sensor group 9, and the notifier 21 through the vehicle network 30.

The wireless communication circuit 29 converts information from the controller 27 into communication data, and transmits the communication data through an antenna 24. Further, the wireless communication circuit 29 receives the communication data through the antenna 24, and converts the received communication data into information to be processed by the controller 27. In the present embodiment, the communication data is data of a communication system in the vehicle-to-vehicle communication, and data of a communication system in the pedestrian-vehicle communication.

The controller 27 includes a control device, which may mainly include a microcomputer having a ROM, a RAM, and a CPU. The controller 27 according to this embodiment periodically generates vehicle information including at least a present position (that is, latitude, longitude, altitude) of the subject vehicle which is detected by the position detection device 11 at a time interval specified in advance. The controller 27 transmits the vehicle information to the communication terminal 50 through the wireless communication circuit 29 every time the vehicle information is generated. The vehicle information may include an orientation of a traveling direction, a speed of the subject vehicle, a present time, identification information (vehicle ID) for identifying a vehicle incorporating the vehicle system 5 therein, and various information generated and acquired by the electronic control unit group 7.

In other words, in the vehicle system 5, the vehicle information is periodically generated at the specified time interval, and then periodically transmitted from the wireless communication circuit 29 to the vehicle communication device 23 installed in another vehicle or the communication terminal 50. At the same time, in the vehicle system 5, a situation of a road around the subject vehicle is informed through the notifier 21 on the basis of the specific information received from the communication terminal 50 and the vehicle information from the vehicle communication device 23 installed in another vehicle.

<Communication Terminal>

Figure 3:
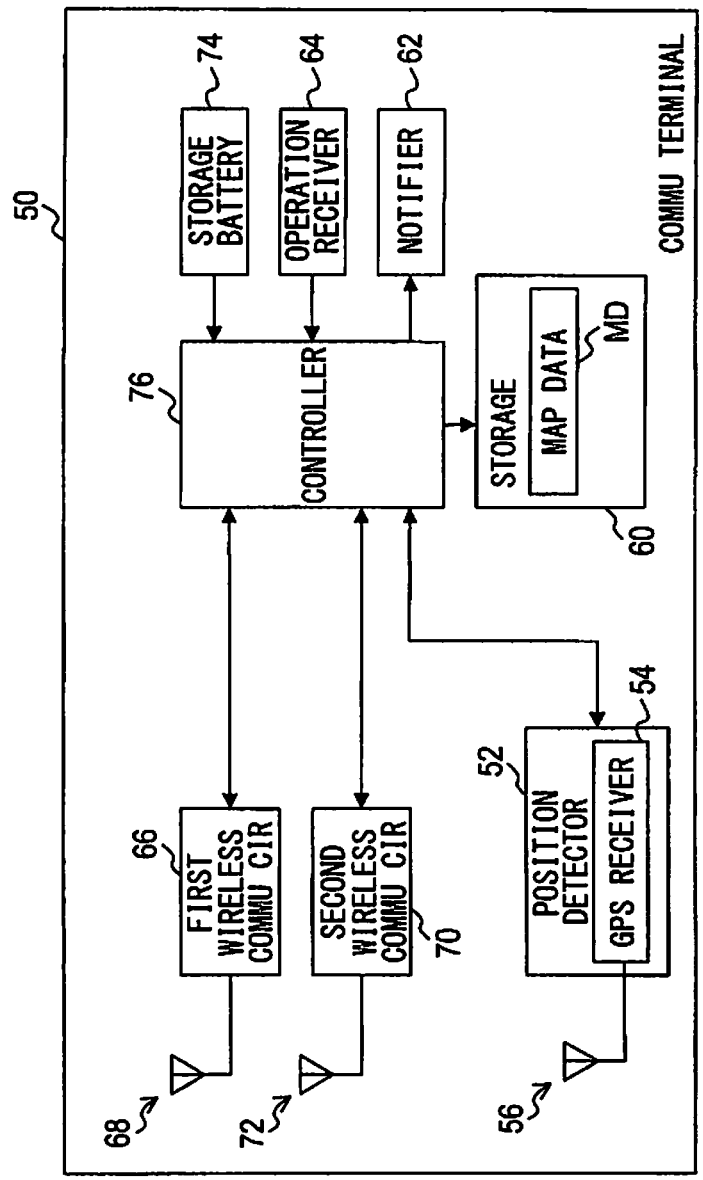
FIG. 3 is a block diagram illustrating a general configuration of a communication terminal.

The communication terminal 50 illustrated in FIG. 3 may be a information processing terminal or a cellular phone. The communication terminal 50 according to this embodiment includes a position detector 52, a storage unit 60, an informing unit 62, an operation receiver 64, a first wireless communication circuit 66, a second wireless communication circuit 70, a controller 76, and a storage battery 74.

Among those components, the position detector 52 is configured to detect the present position (latitude, longitude, altitude) of the communication terminal 50, and includes at least a GPS receiver 54. The GPS receiver 54 receives signals from multiple GPS satellites through an antenna 56, and calculates the present position (latitude, longitude, altitude) of the communication terminal 50. The position detector 52 may include a sensor such as a gyro sensor and a geomagnetic sensor other than GPS receiver 54, for the purpose of correcting the present position of the communication terminal 50.

The storage unit 60 includes a rewritable nonvolatile storage device (for example, a hard disk drive or a flash memory). A map data MD is stored in the storage unit 60 in advance. The map data MD includes diverse data such as node data regarding nodes representing latitudes, longitudes, and altitudes of respective specific points on a road, link data regarding links representing respective roads that connect between the respective nodes, cost data regarding unit costs allocated to the respective links in advance, road data, topographic data, mark data, intersection data representing latitudes, longitudes, and altitudes of the respective intersections, and data of facilities including latitudes, longitudes, and altitudes of crosswalks.

The informing unit 62 includes a device that outputs diverse information on the basis of a signal from the controller 76. The informing unit 62 includes, for example, a display device that displays an image, or a speaker that outputs the information by speech. The display device may also function as a touch panel.

The operation receiver 64 receives an input of the information through an input mechanism (not shown) disposed in the communication terminal 50. In the present embodiment, the input mechanism has a structure that receives the input of information from the external, and includes, for example, mechanical keys (not shown), a touch panel, or a microphone.

The first wireless communication circuit 66 executes information communication by the vehicle-to-vehicle communication and the pedestrian-vehicle communication. The first wireless communication circuit 66 converts information from the controller 76 into communication data, and also transmits the converted communication data through an antenna 68. Further, the first wireless communication circuit 66 receives the communication data through the antenna 68, and also converts the received communication data into information that is to be processed by the controller 76.

The second wireless communication circuit 70 executes information communication or speech communication through a cellular phone network. The second wireless communication circuit 70 transmits information (that is, communication data or speech signal) from the controller 76 to the cellular phone network through an antenna 72. Further, the second wireless communication circuit 70 receives information from the cellular phone network through the antenna 72.

The controller 76 includes a control device, which may mainly include a microcomputer having a ROM, a RAM, and a CPU. A processing program for causing the controller 76 to execute a transmission setting process for setting whether to periodically transmit the specific information including at least the present position (latitude, longitude, altitude) of the communication terminal 50 from the communication terminal 50, or not, is stored in the ROM of the controller 76. The specific information according to this embodiment may include a present time and terminal identification information (hereinafter called "terminal ID") for identifying the communication terminal 50.

The communication terminal 50 according to this embodiment is connected to the storage battery 74. That is, the communication terminal 50 operates with the electric power supplied from the storage battery 74. A power source of the communication terminal 50 is not limited to the storage battery, but may be a primary battery.

<Transmission Setting Process>

The transmission setting process to be executed by the controller 76 of the communication terminal 50 will be described.

The transmission setting process starts when power supply to the respective components of the communication terminal 50 starts, and is thereafter repetitively executed at a time interval specified in advance (hereinafter called "specified time interval").

Figure 4:
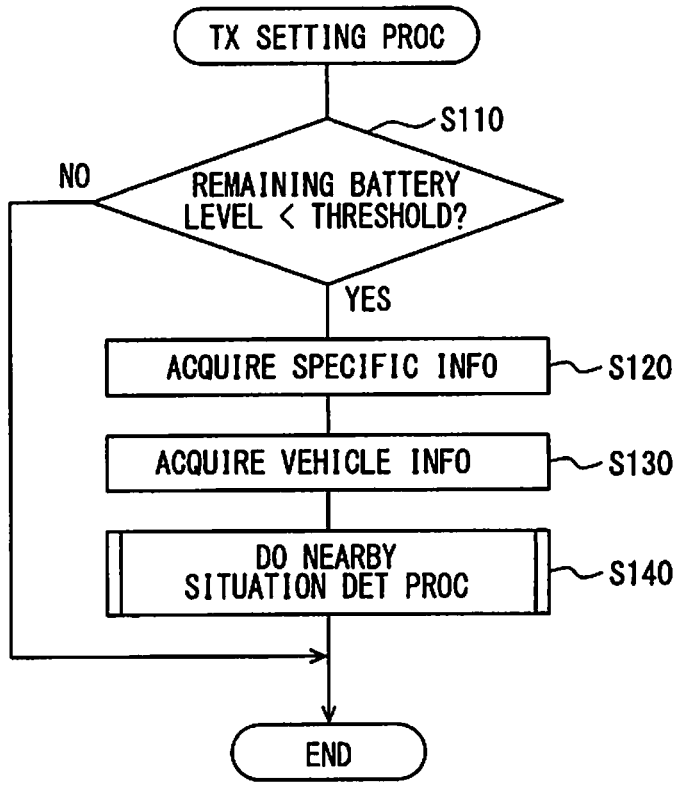
FIG. 4 is a flowchart illustrating a procedure of a transmission setting process to be executed by a communication terminal.

As illustrated in FIG. 4, when the transmission setting process starts, the controller 76 first determines whether a remaining battery power of the storage battery 74 is lower than a specified value that is specified in advance, or not (S110). As a result of the determination in S110, if the remaining battery power of the storage battery 74 is lower than the specified value (YES in S110), the controller 76 acquires the respective specific information (an example of terminal information) from another communication terminal 50 received through the first wireless communication circuit 66 (S120). Further, in the transmission setting process, the controller 76 acquires the respective vehicle information from the vehicle communication device 23 received through the first wireless communication circuit 66 (S130).

Subsequently, the controller 76 executes a peripheral situation determination process for configuring transmission setting on the basis of the situation around the communication terminal 50 (S140). In the present embodiment, the transmission setting represents whether periodic transmission of the specific information is allowed or stops. The transmission setting is conducted on the basis of the situation around the communication terminal 50. The transmission setting represents that the periodic transmission of the specific information is allowed if the setting is on. On the other hand, the transmission setting represents that the periodic transmission of the specific information is inhibited if the setting is off. In the peripheral situation determination process according to this embodiment, the transmission period of the specific information is further set if the transmission setting is on.

Thereafter, when the controller 76 completes the transmission setting process, the controller 76 waits for subsequent start timing.

The controller 76 repetitively acquires the present position (latitude, longitude, altitude) of the communication terminal 50, and generates the specific information including the acquired present position. If the transmission setting which is set in S140 is on, the controller 76 outputs the generated specific information to the first wireless communication circuit 66 in the transmission period that has been set in S140. The first wireless communication circuit 66 converts the specific information into the communication data, and transmits the communication data to the external. If the transmission setting is off, the controller 76 stops the periodic transmission of the specific information.

Incidentally, in the transmission setting process, if the remaining battery power of the storage battery 74 is equal to or more than the specified value as a result of the determination in S110 (NO in S110), the controller 76 completes the transmission setting process, and waits for a subsequent start timing.

In this embodiment, the transmission setting and the transmission period may be set before the present transmission setting process. For example, if the remaining battery power of the storage battery 74 is equal to or more than the specified value (NO in S110), the controller 76 may generate the specific information, and output the specific information to the first wireless communication circuit 66 in accordance with the transmission setting and the transmission period which are set before the present transmission setting process. Alternatively, the controller 76 may periodically generate the specific information, and output the specific information to the first wireless communication circuit 66 regardless of the content of the transmission setting.

<Peripheral Situation Determination Process>

Figure 5:
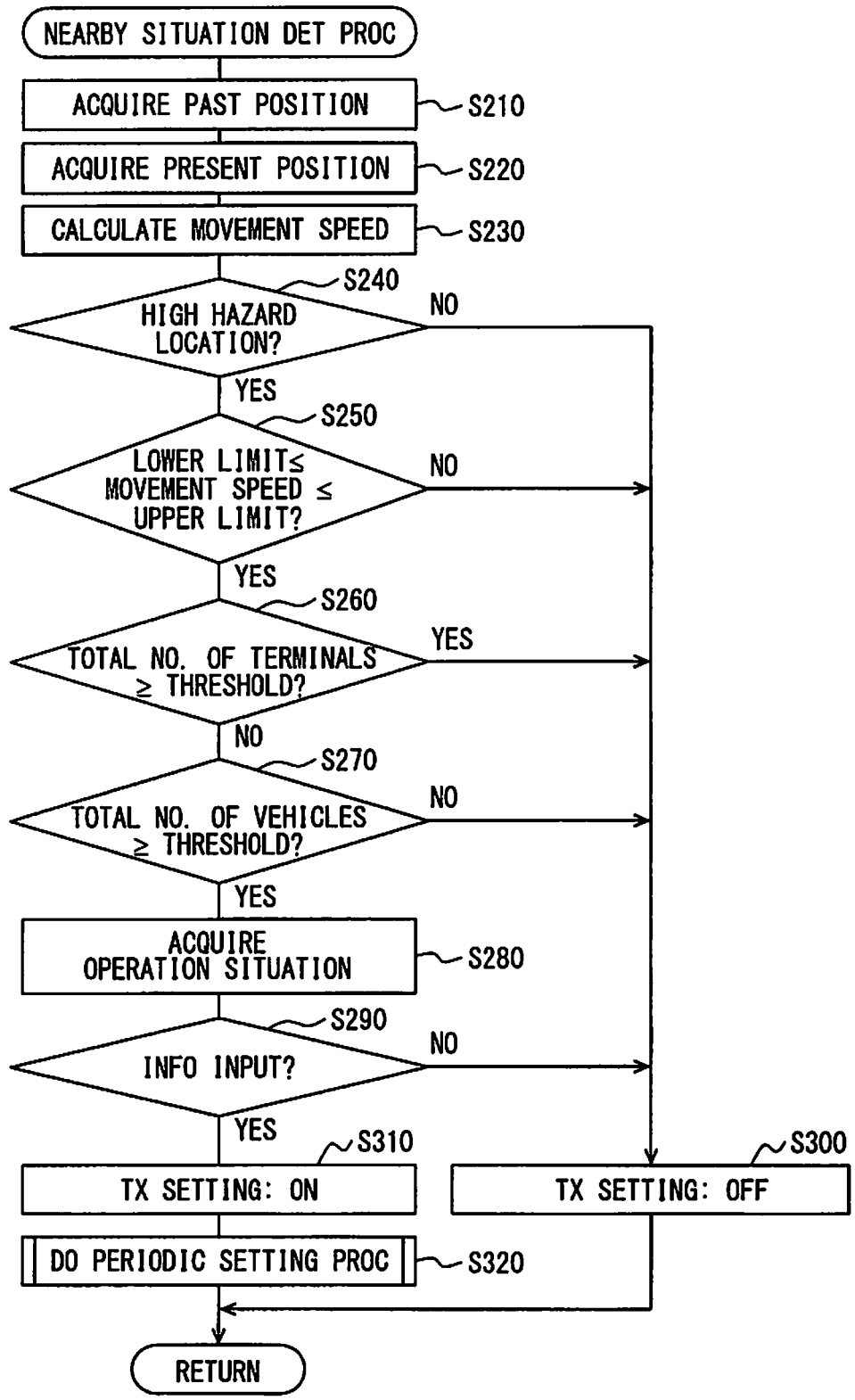
FIG. 5 is a flowchart illustrating a procedure of a peripheral situation determination process.

In the peripheral situation determination process executed in S140 of the transmission setting process, as illustrated in FIG. 5, the controller 76 first acquires the position (that is, latitude, longitude, altitude; hereinafter called "past position") of the communication terminal 50 which was acquired in the previously-executed peripheral situation determination process, which was executed one time before this present time (S210). Subsequently, the controller 76 acquires the present position (latitude, longitude, altitude) of the communication terminal 50, and stores the acquired present position in the storage unit 60 (S220). That is, the present position stored in the storage unit 60 in S220 becomes the past position when the peripheral situation determination process starts next time.

Then, the controller 76 calculates a movement speed of the communication terminal 50 on the basis of the past position acquired in S210 and the present position acquired in S220 (S230). In S230, for example, a distance (hereinafter called "movement distance") between the past position and the present position may be calculated, and the movement distance may be divided by the specified time interval to calculate the movement speed of the communication terminal 50.

Further, in the peripheral situation determination process, it is determined whether a location at which the communication terminal 50 is present is a high hazard location, or not (S240). As a result of the determination in S240, if the location at which the communication terminal 50 is present is not the high hazard location (NO in S240), the peripheral situation determination process proceeds to S300.

In the present embodiment, the high hazard location is a location in which an accident likelihood, which represents a degree of possibility that an accident occurs between a person carrying the communication terminal 50 and the vehicle AM is equal to or higher than a specified threshold, for example, on a road including a sidewalk and a roadside.

The determination of whether the location in which the communication terminal 50 is present is the high hazard location, or not, may be implemented by checking the present position (latitude, longitude, altitude) of the communication terminal 50 against the map data MD stored in the storage unit 60. In this case, if a road that matches (complies with) the latitude, the longitude, and the altitude included in the present position of the communication terminal 50 is present in roads represented by the map data MD stored in the storage unit 60, it may be determined that the location in which the communication terminal 50 is present is the high hazard location.

The determination of whether the location in which the communication terminal 50 is present is the high hazard, or not, may be implemented by comparing the altitude included in the present position of the communication terminal 50 with vehicle altitude information. In this case, if the altitude included in the present position of the communication terminal 50 matches the vehicle altitude information, it may be determined that the location in which the communication terminal 50 is present is the high hazard location. In the present embodiment, the vehicle altitude information represents the altitude of the vehicle AM included in the vehicle information transmitted from the vehicle system 5.

As a result of the determination in S240, if the location at which the communication terminal 50 is present is the high hazard location (YES in S240), the controller 76 allows the peripheral situation determination process to proceed to S250.

In S250, the controller 76 determines whether or not the movement speed of the communication terminal 50 calculated in S230 is equal to or higher than a walking lower limit speed and whether or not the speed of the communication terminal 50 calculated in S230 is equal to or lower than a walking upper limit speed. In the present embodiment, the walking lower limit speed represents a speed specified in advance and a lower limit value of the speed at which a person is considered to walk. The walking upper limit speed represents a speed specified in advance and an upper limit value of a walking speed at which the person can walk.

As a result of the determination in S250, if the movement speed of the communication terminal 50 falls below the walking lower limit speed, or exceeds the walking upper limit speed (NO in S250), the controller 76 allows the peripheral situation determination process to proceed to S300. That is, if the movement speed falls below the walking lower limit speed, it is determined that a person carrying the communication terminal 50 stops, and the process proceeds to S300. If the movement speed exceeds the walking upper limit speed, it is determined that the person carrying the communication terminal 50 is moving and is on the movable body, and the process proceeds to S300.

As a result of the determination in S250, if the movement speed of the communication terminal 50 is equal to or higher than the walking lower limit speed, and equal to or lower than the walking upper limit speed (YES in S250), the controller 76 allows the peripheral situation determination process to proceed to S260. In S260, the controller 76 determines whether the total number of other communication terminals (hereinafter called "other terminals") 50 present within the area of the specified distance from the communication terminal 50 is equal to or larger than a specified number (for example, "11") which is specified in advance, or not (S260). In S260, for example, the total number of other terminals 50 present within the area of the specified distance from the communication terminal 50 may be calculated and specified on the basis of the specific information acquired in previous S120. In addition, when the terminal IDs are included in the specific information, the total number of terminal IDs different from each other included in the respective specific information may be specified as the total number of other terminals 50 present within the area of the specified distance from the communication terminal 50. The total number of other terminals 50 present within the area of the specified distance may be simply specified with the total number of specific information acquired in S120. In the present embodiment, the other terminals 50 are an example of an external terminal.

As a result of the determination in S260, if the total number of other terminals 50 present within the area of the specified distance from the communication terminal 50 is equal to or larger than the specified number (YES in S260), the controller 76 allows the peripheral situation determination process to proceed to S300. On the other hand, as a result of the determination in S260, if the total number of other terminals 50 present within the area of the specified distance from the communication terminal 50 is smaller than the specified number (NO in S260), the controller 76 allows the peripheral situation determination process to proceed to S270.

In S270, the controller 76 determines whether the total number of vehicle systems 5 (that is, the total number of vehicles) present within the area of the specified distance from the communication terminal 50 is equal to or larger than a set number (for example, "1") which is specified in advance, or not. In S270, for example, the total number of vehicle systems 5 present within the area of the specified distance from the communication terminal 50 may be calculated and specified on the basis of the vehicle information acquired in previous S130. In addition, when the vehicle IDs are included in the vehicle information, the total number of vehicle IDs different from each other included in the vehicle information may be specified as the total number of vehicle systems 5 present within the area of the specified distance from the communication terminal 50. The total number of vehicle systems 5 present within the area of the specified distance may be simply specified with the total number of vehicle information acquired in S130. In the present disclosure, the vehicle system 5 is an example of an external on-board device.

Then, as a result of the determination in S270, if the total number of vehicle systems 5 present within the area of the specified distance from the communication terminal 50 is smaller than the set number (NO in S260), the controller 76 allows the peripheral situation determination process to proceed to S300. On the other hand, as a result of the determination in S270, if the total number of vehicle systems 5 present within the area of the specified distance from the communication terminal 50 is equal to or larger than the set number (YES in S270), the controller 76 allows the peripheral situation determination process to proceed to S280.

In S280, the controller 76 acquires the operation situation of the input mechanism through the operation receiver 64 (S280). Subsequently, the controller 76 determines whether the operation situation of the input mechanism acquired in S280 represents receiving the input of the information through the input mechanism, or not (S290).

As a result of the determination in S290, if the input of the information is not received through the input mechanism (NO in S290), it is determined that the person carrying the communication terminal 50 pays attention to the periphery of the person, and the controller 76 allows the peripheral situation determination process to proceed to S300.

In S300, the controller 76 turns off the transmission setting so that the periodic transmission of the specific information stops. Thereafter, the controller 76 completes the peripheral situation determination process and consequently completes the transmission setting process. The peripheral situation determination process also proceeds to S300 when the location in which the communication terminal 50 is present is not the high hazard location (NO in S240) and when: the movement speed of the communication terminal 50 falls below the walking lower limit speed; or the movement speed of the communication terminal 50 exceeds the walking upper limit speed (NO in S250). Further, the peripheral situation determination process also proceeds to S300 when the total number of other terminals 50 present within the area of the specified distance from the communication terminal 50 is equal to or larger than the specified number (YES in S260) and when the total number of vehicle systems 5 present within the area of the specified distance from the communication terminal 50 is smaller than the set number (NO in S260).

In the peripheral situation determination process, as a result of the determination in S290, if the input of the information is received through the input mechanism (YES in S290), it is determined that the person carrying the communication terminal 50 is not paying attention to the periphery of the person, and the controller 76 allows the peripheral situation determination process to proceed to S310. In S310, the controller 76 turns on the transmission setting so that the periodic transmission of the specific information is allowed.

Subsequently, in the peripheral situation determination process, the controller 76 executes a period setting process for setting the transmission period of the specific information (S320).

Thereafter, the controller 76 completes the peripheral situation determination process and consequently completes the transmission setting process.

<Period Setting Process>

Figure 6:
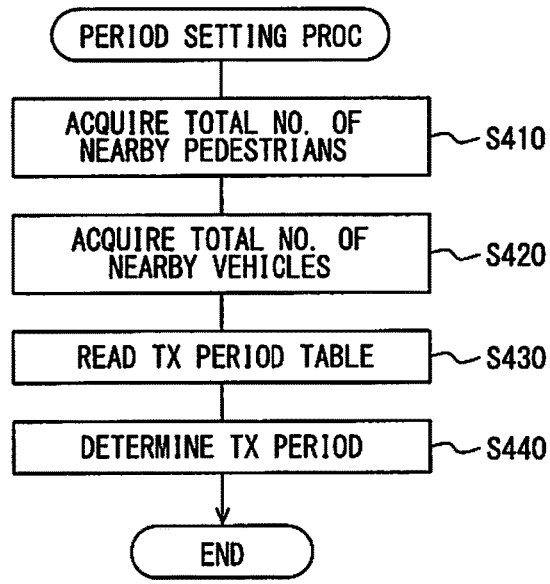
FIG. 6 is a flowchart illustrating a procedure of a period setting process.

In the period setting process executed in S320 of the peripheral situation determination process, as illustrated in FIG. 6, the controller 76 first acquires the total number of peripheral pedestrians N (S410). In the present embodiment, the total number of peripheral pedestrians N is the total number of pedestrians present within the area of the specified distance from the communication terminal 50. In S410, for example, the total number of other terminals 50 present within the area of the specified distance from the communication terminal 50, which is specified in S260 of the previous peripheral situation determination process may be acquired as the total number of peripheral pedestrians N.

Subsequently, in the period setting process, the controller 76 acquires the total number of peripheral vehicles M (S420). In the present embodiment, the total number of peripheral vehicles M represents the total number of vehicles AM that are traveling within the area of the specified distance from the communication terminal 50. In S410, for example, the total number of vehicle systems 5 present within the area of the specified distance from the communication terminal 50, which is specified in S270 of the previous peripheral situation determination process, may be acquired as the total number of peripheral vehicles M.

Further, in the period setting process, the controller 76 reads the transmission period table (S430).

Figure 7:
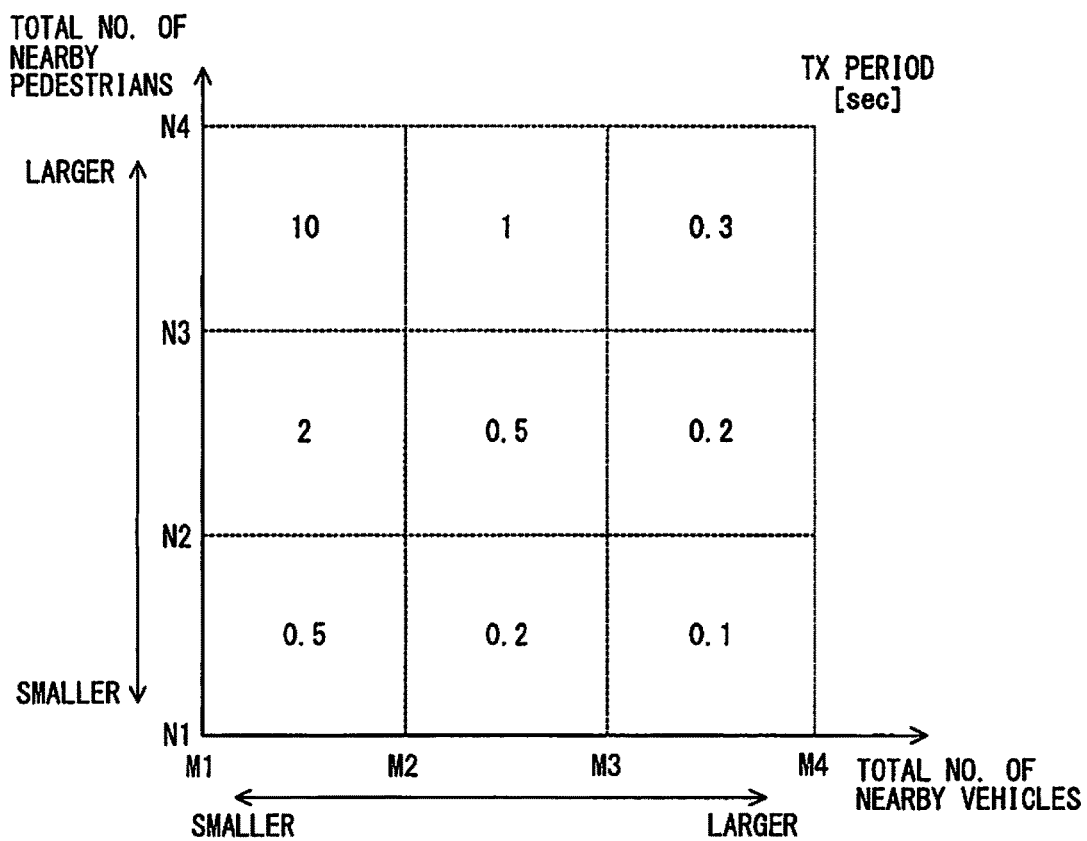
FIG. 7 is a diagram illustrating a transmission period table used in a period setting process.

As illustrated in FIG. 7, the transmission period table associates the total number of peripheral pedestrians N, the total number of peripheral vehicles M, and the transmission period with each other in advance.

The transmission period is specified so that the transmission interval of the specific information becomes shorter as the total number of peripheral pedestrians N is smaller. The transmission period is specified so that the transmission interval of the specific information becomes longer as the total number of peripheral pedestrians N is larger.

Further, the transmission period is specified so that the transmission interval of the specific information becomes longer as the total number of peripheral vehicles M is smaller. The transmission period is specified so that the transmission interval of the specific information becomes smaller as the total number of peripheral vehicles M is larger.

In the period setting process, from the transmission period table read in S430, the controller 76 acquires the transmission period corresponding to the total number of peripheral pedestrians N acquired in S410 and the total number of peripheral vehicles M acquired in S420, and sets the acquired transmission period (S440).

Thereafter, the period setting process is completed.

That is, in the communication terminal 50, if it is determined that the accident likelihood is lower than the specified threshold on the basis of the situation around the communication terminal 50, the transmission setting is set to off. If it is determined that the accident likelihood is equal to or higher than the specified threshold, the transmission setting is set to on.

Then, in the period setting process according to this embodiment, if the transmission setting is set to on, the transmission period is set so that the transmission interval of the specific information is shorter as the total number of peripheral pedestrians N is smaller, and that the transmission interval of the specific information becomes longer as the total number of peripheral pedestrians N is larger. Further, in the period setting process according to this embodiment, if the transmission setting is set to on, the transmission period is set so that the transmission interval of the specific information becomes longer as the total number of peripheral vehicles M is smaller, and that the transmission interval of the specific information becomes shorter as the total number of peripheral vehicles M is larger.

The communication terminal 50 repetitively acquires the present position (latitude, longitude, altitude) of the communication terminal 50, and generates the specific information including the acquired present position. Further, if the transmission setting is on, the controller 76 outputs the generated specific information to the first wireless communication circuit 66 in the set transmission period. The first wireless communication circuit 66 converts the specific information into the communication data, and transmits the communication data to the external. If the transmission setting is off, the controller 76 stops the periodic transmission of the specific information.

Technical Effects of Embodiments

As described above, according to the communication terminal 50, the specific information including the position at which the communication terminal 50 is present can be periodically transmitted in the set transmission period. As a result, the position at which the communication terminal 50 is present can be notified a user of another communication terminal 50 or the vehicle system 5.

In particular, in the communication terminal 50, the transmission of the specific information to the user of the vehicle system 5 can contribute to realization of the safe road traffic.

Also, in the communication terminal 50, the transmission period is set in accordance with the total number of peripheral pedestrians N and the total number of peripheral vehicles M.

In other words, because the other terminals 50 transmit the specific information, even if the communication terminal 50 does not transmit the specific information, the vehicle system 5 can use the specific information from the other terminals 50 instead of the specific information from the communication terminal 50. For that reason, even if the transmission interval at which the communication terminal 50 periodically transmits the specific information is set longer, the presence of the person carrying the communication terminal 50 within a predetermined area can be notified the user of the vehicle system 5 of.

That is, in the period setting process according to this embodiment, the transmission interval is set longer as the total number of peripheral pedestrians N is larger. Therefore, it becomes possible to save the power consumption while ensuring an opportunity for informing the presence of the person carrying the communication terminal 50.

On the other hand, if the total number of peripheral vehicles M present around the communication terminal 50 is small, the possibility that the person carrying the communication terminal 50 has an accident with the peripheral vehicle is low. For that reason, in the period setting process according to this embodiment, the transmission interval at which the communication terminal 50 transmits the specific information is more shortened as the total number of peripheral vehicles M is smaller.

In other words, according to the communication terminal 50, both of the transmission of necessary position information and the saving of power consumption can be implemented.

In particular, according to the peripheral situation determination process of this embodiment, if the total number of other terminals 50 (that is, the total number of peripheral pedestrians N) is equal to or larger than the specified number, the periodic transmission of the specific information stops. As a result, according to the communication terminal 50, the power consumption can be more surely saved.

Incidentally, if the total number of peripheral pedestrians N is small, it may be preferable to increase a transmission frequency of the specific information from the communication terminal 50 in order to ensure the notification opportunity of the specific information. For that reason, in the period setting process according to this embodiment, the transmission interval is more shortened as the total number of peripheral pedestrians N is smaller.

If the total number of peripheral vehicles M is large, it may be preferable to increase the transmission frequency of the specific information from the communication terminal 50 in order to reduce the possibility that the person carrying the communication terminal 50 has the vehicle accident. For that reason, in the period setting process according to this embodiment, the transmission interval is more shortened as the total number of peripheral vehicles M is larger.

As a result, according to the communication terminal 50, both of the transmission of necessary position information and the saving of power consumption can be implemented. Further, the communication terminal 50 can contribute to the realization of the safe road traffic.

According to the peripheral situation determination process of this embodiment, if the total number of vehicle systems 5 (that is, the total number of peripheral vehicles M) is smaller than the set number, the periodic transmission of the specific information stops. As a result, the communication terminal 50 can surely save the power consumption.

In other words, according to the communication terminal 50, it become possible to implement both of the transmission of necessary position information and the saving of power consumption by setting the transmission period in accordance with the total number of peripheral pedestrians N and the total number of peripheral vehicles M.

Further, according to the communication terminal 50, because the transmission of unnecessary specific information can be prevented, the possibility of communication channel congestion is lowered.

Furthermore, in the peripheral situation determination process of this embodiment, when the communication terminal 50 is present in the high hazard, the specific information including the present position is periodically transmitted.

Therefore, according to the communication terminal 50, the occupant of the vehicle AM equipped with the vehicle system 5 can be notified that the person carrying the communication terminal 50 is present in the high hazard location. For that reason, the communication terminal 50 can contribute to the realization of the safe road traffic.

If the communication terminal 50 is not present in the high hazard location, the possibility that an accident occurs between the person carrying the communication terminal 50 and the vehicle is low. For that reason, in the peripheral situation determination process, the periodic transmission of the specific information stops.

Therefore according to the communication terminal 50, the unnecessary transmission of the specific information can be prevented, and the power consumption can be saved.

When the communication terminal 50 is present inside the movable body, the possibility that the person carrying the communication terminal 50 is on the movable body is high, and the possibility that the person has an accident with the vehicle AM is low. When the person carrying the communication terminal 50 is present and stops outside the movable body, the possibility that the person carrying the communication terminal 50 has the vehicle accident is low.

For that reason, in the peripheral situation determination process, if the communication terminal 50 is present outside the movable body and the person carrying the communication terminal 50 walks, the periodic transmission of the specific information is executed. If the communication terminal 50 stops or is present inside the movable body, the periodic transmission of the specific information stops.

Therefore, according to the communication terminal 50, the unnecessary periodical-transmission of the specific information can be prevented and the power consumption can be saved.

In the peripheral situation determination process according to this embodiment, the calculation of the movement speed is implemented on the basis of the transition of the position of the communication terminal 50. For that reason, according to the communication terminal 50, there is no need to provide a new sensor for detecting the speed other than the position detector 52. For that reason, according to the communication terminal 50, the device configuration of the communication terminal 50 can be simplified.

In the peripheral situation determination process according to this embodiment, when the input of the information is received through the input mechanism, that is, when the person carrying the communication terminal 50 operates the input mechanism of the communication terminal 50, the transmission setting is changed to on, so that the periodic transmission of the specific information is executed.

This is because when the person carrying the communication terminal 50 is operating keys of the communication terminal 50, the possibility that the person carrying the communication terminal 50 is not paying attention to the periphery of the person is high, and there is a possibility that the person collides with the vehicle or another pedestrian.

In other words, when the keys of the communication terminal 50 are operated, the communication terminal 50 executes the periodic transmission of the specific information, and thus users of other communication terminals 50 are notified of the position of the communication terminal 50 concerned.

Other Embodiments

Although the embodiment is illustrated above, the above illustrated embodiment does not limit embodiments and can be modified in various ways.

For example, in the transmission setting process, S110 may be omitted. In the peripheral situation determination process, although S240, S250, S260, S270, and S290 are executed to determine whether or not the accident likelihood is lower than the specified threshold, at least one of S240, S250, S260, S270, and S290 may be omitted in other embodiments.

Further, in the peripheral situation determination process according to the above embodiment, the movement speed is calculated on the basis of the transition of the position of the communication terminal 50. However, the calculation of the movement speed is not limited to the above configuration. In S250 in the peripheral situation determination process of the above embodiment, it is determined whether the movement speed is equal to or higher than the "walking lower limit speed" or not and whether the movement speed is equal to or lower than the "walking upper limit speed". S250 in other embodiments may make a determination of either one of whether or not the movement speed is equal to or higher than the "walking lower limit speed" and whether the movement speed is equal to or lower than the "walking upper limit speed".

In the peripheral situation determination process, when S250 is omitted, S210 to S230 in the peripheral situation determination process may be omitted.

In another embodiment, when all of S240, S250, S260, S270, and S290 are omitted, S300 and S310 may be omitted. In other words, in another embodiment, only S320 may be executed. In the peripheral situation determination process in this case, the transmission setting may be set to on and the transmission period may be set in accordance with the total number of peripheral pedestrians N and the total number of peripheral vehicles M.

Also, the communication terminal 50 in the above embodiment is configured as an information processing terminal or a cellular phone, but is not limited to these configurations.

That is, in the communication terminal of another embodiment, the second wireless communication circuit 70 and the antenna 72 may be omitted, and the communication terminal may be configured as a dedicated terminal for transmitting the present position (latitude, longitude, altitude) of the person carrying the terminal. In the communication terminal of another embodiment, the notifier 62 may be omitted.

The communication terminal 50 according to the above embodiment is portable by the person, but the communication terminal according to another embodiment may be configured as a stationary device.

Further, in the communication terminal 50, the map data MD may not be stored in the storage unit 60. Further, the storage unit 60 may be omitted in the communication terminal 50.

In the communication system 1 according to the above embodiment, the communication system of the vehicle-to-vehicle communication or the pedestrian-vehicle communication is assumed as the information communication between the vehicle system 5 and the communication terminal 50. However, the information communication between the vehicle system 5 and the communication terminal 50 is not limited to the above configuration. For example, the information communication between the vehicle system 5 and the communication terminal 50 in another embodiment may be realized by communication through the cellular phone network.

In the above embodiments, the present position of the communication terminal 50 and the vehicle system 5 includes the latitude, the longitude, and the altitude. However, the information included in the present position of the communication terminal 50 and the vehicle system 5 is not limited to this configuration. The present position in another embodiment may not include the altitude. That is, the present position in another embodiment may include at least the latitude and the longitude.

In the above embodiments and modifications, the communication terminal 50 corresponds to an example of a subject communication terminal. The storage battery 74 corresponds to an example of a battery. The vehicle system 50 and other communication terminals 50 correspond to examples of external communication devices. The vehicle system 50 corresponds to an external on-board device. The other communication terminals 50 correspond to an example of an external terminal. The wireless communication circuit 66 and the controller 76 executing S120 and S130 correspond to an example of a terminal information acquisition section. The position detector 52 corresponds to an example of a position acquisition section. The wireless communication circuit 66 and the controller 76 correspond to an example of a transmission section. The controller 76 executing S410 and S420 corresponds to an example of a detection section. The controller 76 executing S430 and S430 corresponds to an example of a setting section. The controller 76 executing S260 and S300 corresponds to an example of a first transmission stop section. The controller 76 executing S270 and S300 corresponds to an example of a second transmission stop section. The controller 76 executing S250 and S300 corresponds to an example of a third transmission stop section. The controller 76 executing S250 and S300 corresponds to an example of a fourth transmission stop section. The controller 76 executing S290 and S300 corresponds to an example of a fifth transmission stop section. The controller 76 executing S240 and S300 corresponds to an example of a sixth transmission stop section. The controller 76 executing S250 corresponds to an example of a first determination section. The controller 76 executing S250 corresponds to an example of a second determination section. The controller 76 executing S240 corresponds to an example of a third determination section. The controller 76 executing S280 corresponds to an example of an input receiving section.

According to the above embodiments and modifications, a subject communication terminal can be configured in various ways. For example, a subject communication terminal operates with electric power stored in a battery and executes information communication with an external communication device separated from and external to the subject communication terminal.

The subject communication terminal comprises a terminal information acquisition section, a position acquisition section, a transmission section, a detection section, and a setting section.

The terminal information acquisition section repetitively acquires terminal information including a present position of the external communication device by the information communication. The position acquisition section repetitively acquires specific information including a present position of the subject communication terminal.

The transmission section transmits the specific information by the information communication in a set transmission period, the specific information being acquired by the position acquisition section. The detection section detects a total number of external communication devices present within an area of a pre-specified distance from the subject communication terminal based on the present position included in the specific information acquired by the position acquisition section and the terminal information acquired by the terminal information acquisition section. The setting section sets the transmission period in accordance with the total number of external communication devices detected by the detection section.

According to the subject communication terminal described above, the specific information including the position at which the subject communication terminal is present can be periodically transmitted in the set transmission period. As a result, a user of the external communication device is notified of the position at which the subject communication terminal is present. For example, if an installation location of the external communication device is within a vehicle, the communication terminal according to the present disclosure can contribute to the realization of safe road traffic.

Furthermore, according to the subject communication terminal, the transmission period can be set in accordance with the total number of external communication devices. For example, when an external terminal carried by a person is included as one kind of the external communication device, another external communication device present around the communication terminal can use, in place of the specific information from the subject communication terminal, the terminal information transmitted from the external terminal.

When a large number of external communication devices are present around the subject communication terminal, the respective external communication devices transmit the terminal information. Therefore, in the subject communication terminal, even if a transmission interval at which the communication terminal transmits the specific information is lengthened, users of the external communication devices can be notified of the presence of a person carrying the communication terminal within the predetermined area.

As a result, according to the above-configured subject communication terminal, the power consumption can be saved while ensuring opportunities to notify the users of the external communication devices that the person carrying the subject communication terminal is present.

That is, according to the above-configured subject communication terminal, the unnecessary transmission of the specific information beyond necessity can be prevented and the power consumption can be saved.

When a small number of external communication devices are present around the subject communication terminal, it may be necessary for the subject communication terminal to transmit the specific information in order to ensure the opportunities to notify the users of the external communication devices of position information of the person carrying the subject communication terminal. For that reason, when the small number of external communication devices are present around the subject communication terminal, the transmission interval at which the subject communication terminal transmits the specific information may be shortened, so that the total number of transmission of information on the position of the person carrying the subject communication terminal is present increases to realize the safe road traffic.

From the above viewpoint, when the transmission period is set in accordance with the total number of external communication devices, both of the transmission of the necessary position information and the saving of the power consumption can be accomplished.

Furthermore, according to the above configuration of the subject communication terminal, because transmission of the unnecessary specific information can be prevented, a possibility of congestion in a communication channel is lowered.

Furthermore, an external terminal carried by a person may be detected as one type of the external communication devices. In this case, if a large number of external terminals are present within the area of the specified distance from the subject communication terminal, the terminal information transmitted from those external terminals can be used in place of the specific information transmitted from the subject communication terminal. In this case, the subject communication terminal therefore may not transmit the specific information.

For that reason, the subject communication terminal may set the transmission period so that the transmission interval becomes longer as the total number of external terminals is larger.

According to this configuration, both of the prevention of the specific information transmission beyond necessity and the power consumption saving can be more surely accomplished.

One type of external communication devices may be detected as an external on-board device that is installed in a movable body. In this case, the subject communication terminal may set the transmission period so that the transmission interval becomes longer as the total number of external on-board devices is smaller.

That is, if the small number of external on-board devices are present within the area of the specified distance from the subject communication terminal, the small number of moving bodies are present around the person carrying the subject communication terminal and the safety of the person is easily ensured.

Therefore, both of the prevention of the specific information transmission beyond necessity and the power consumption saving can be more surely accomplished.

It is noted that the above technical idea can be realized by not only the communication terminal but also various modes. For example, the above technical idea can be realized by a program executed by a computer for transmitting and receiving the specific information and a method for transmitting and receiving the specific information. Such programs may be stored in a non-transitory storage medium.

Although embodiments and modifications have been illustrated above, embodiments and modifications simplified to the extent that the object of present disclosure is accomplished are also included in embodiments and modifications of the present disclosure. Furthermore, embodiments and modifications obtained by appropriately combining technical portions of the above embodiments and modifications are also included in embodiments and modifications. That is, any embodiments and modifications within the spirit and scope of the present disclosure are also included in embodiments and modifications.

What is claimed is:

1. A subject communication terminal that operates with electric power stored in a battery and executes information communication with a plurality of external communication devices separated from and external to the subject communication terminal, the subject communication terminal comprising:
    a terminal information acquisition section that repetitively acquires terminal information including a present position of each of the plurality of external communication devices by the information communication;
    a position acquisition section that repetitively acquires specific information including a present position of the subject communication terminal;
    a transmission section that transmits the specific information by the information communication based on a transmission period, the specific information being acquired by the position acquisition section;
    a detection section that detects a total number of the plurality of external communication devices present within an area of a pre-specified distance from the subject communication terminal based on the present position included in the specific information acquired by the position acquisition section and the terminal information acquired by the terminal information acquisition section and also detects a total number of surrounding pedestrians included in the total number of the external communication devices and a total number of surrounding vehicles included in the total number of the external communication devices; and
    a setting section that sets the transmission period in accordance with an association between the number of surrounding pedestrians and the number of surrounding vehicles detected by the detection section,
    wherein:
    the subject communication terminal is carried by a person, and
    the transmission section transmits the specific information when the total number of the external communication devices detected by the detection section is smaller than a specified number which is specified in advance,
    the subject communication terminal further comprising a first transmission stop section that stops the transmission section from transmitting the specific information when the total number of the external communication devices detected by the detection section is equal to or larger than the specified number which is specified in advance.

2. The subject communication terminal according to claim 1, wherein: the setting section sets the transmission period so that a transmission interval becomes longer as the total number of surrounding pedestrians included in the total number of the external communication devices detected by the detection section is larger.

3. The subject communication terminal according to claim 1, further comprising:
    a first determination section that determines whether or not the subject communication terminal is present inside a movable body based on the specific information acquired by the position acquisition section; and
    a third transmission stop section that
        permits the transmission section to transmit the specific information when the first determination section determines that the subject communication terminal is present outside the movable body, and
        stops the transmission section from transmitting the specific information when the first determination section determines that the subject communication terminal is present inside the movable body.

4. The subject communication terminal according to claim 1, further comprising:
    a second determination section that determines whether the subject communication terminal is moving or is in a stopped state based on the specific information acquired by the position acquisition section, and
    a fourth transmission stop section that
        permits the transmission section to transmit the specific information when the second determination section determines that the subject communication terminal is in the stopped state, and
        stops the transmission section from transmitting the specific information when the second determination section determines that the subject communication terminal is moving.

5. The subject communication terminal according to claim 1, further comprising:
    an input receiving section that receives an input of information on whether the person is operating an input mechanism of the subject communication terminal; and
    a fifth transmission stop section that
        permits the transmission section to transmit the specific information when the input of the information received by the input receiving section indicates the person is not operating the input mechanism, and
        stops the transmission section from transmitting the specific information when the input of the information is not received by the input receiving section.

6. The subject communication terminal according to claim 1, further comprising:
- a third determination section that determines, based on the specific information acquired by the position acquisition section, whether or not the present position of the subject communication terminal is a high hazard location defined as a location in which an accident likelihood representing a possibility that a vehicle accident occurs is equal to or higher than a specified threshold; and
- a sixth transmission stop section that
    - permits the transmission section to transmit the specific information when the third determination section determines that the present position of the subject communication terminal is the high hazard location, and
    - stops the transmission section from transmitting the specific information when the third determination section determines that the present position of the subject communication terminal is not the high hazard location.

7. The subject communication terminal according to claim 1, wherein the transmission period is determined from a transmission period table which is divided into a plurality of areas based on a relationship between the total number of surrounding pedestrians included in the total number of the external communication devices and the total number of surrounding vehicles included in the total number of the external communication devices.

* * * * *